United States Patent [19]

Gilliland, III et al.

[11] Patent Number: 4,880,293

[45] Date of Patent: Nov. 14, 1989

[54] OPTIC FIBER SHUTTER APPARATUS

[75] Inventor: B. David Gilliland, III; John R. Beard, both of Memphis, Tenn.; Peter A. Hochstein, Sterling Heights, MI

[73] Assignee: DRD, Ltd., Memphis, Tenn.

[21] Appl. No.: 186,188

[22] Filed: Apr. 26, 1988

Related U.S. Application Data

[63] Continuation of Ser. No. 694,289, Jan. 24, 1985, Pat. No. 4,778,254, and a continuation-in-part of Ser. No. 545,658, Oct. 26, 1983, abandoned.

[51] Int. Cl.$^4$ .................. G02B 26/02; G03B 27/72
[52] U.S. Cl. .................................. 350/269; 355/71
[58] Field of Search ................. 350/269, 275; 355/71

[56] References Cited

U.S. PATENT DOCUMENTS

2,687,611 8/1954 Larsen .
2,934,647 4/1960 Blake .
3,493,292 2/1970 Dostal .
4,033,693 7/1977 Payrhammer et al. .
4,082,435 4/1978 Zeitz .
4,088,405 5/1978 Pustka et al. .

Primary Examiner—Bruce Y. Arnold
Assistant Examiner—P. M. Dzierzynski
Attorney, Agent, or Firm—Willian Brinks Olds Hofer Gilson & Lione

[57] ABSTRACT

An apparatus for selectively shuttering a light aperture or channel which includes a shutter blade that is rapidly moved by magnetic force between spaced apart end positions. The shutter apparatus maintains the shutter blade stable in either of the two end positions by magnetic attraction, and preferably provides a third stable position for the shutter blade which is intermediate the two end positions, such that the shutter blade has three stable positions corresponding to full, partial and no shuttering of the aperture or channel. In one embodiment, the shutter blade is part of a flag carried by a torsion beam which is fixed at one end in a mount in a cantilever arrangement, and is free to twist about its longitudinal axis. An elongated permanent magnet extends transverse to the flag and presents poles of opposite polarity. An electromagnetic system effects the movement of the elongated permanent magnet, and hence the selective movement of the flag and shutter blade, by attracting and/or repelling the permanent magnet between two end stops. The electromagnetic system includes an E-shaped pole piece of ferromagnetic material which presents three poles. The two outermost poles each have an electrically conductive winding thereon, thereby forming first and second electromagnets. The middle and salient pole is equidistant between the end poles and facilitates the movement of the permanent magnet.

12 Claims, 3 Drawing Sheets

OPTIC FIBER SHUTTER APPARATUS

RELATED CASES

This application is a continuation of U.S. Ser. No. 694,289, filed Jan. 24, 1985, now U.S. Pat. No. 4,778,254, and a continuation in part of U.S. Ser. No. 545,658, filed Oct. 26, 1983, abandoned.

FIELD OF THE INVENTION

This invention relates generally to devices for selectively shuttering an aperture through which light is to travel, and more particularly relates to an extremely small, high speed shutter apparatus for a very narrow light channel, such as a single optic fiber.

BACKGROUND OF THE INVENTION

It is known in the art to provide a shutter mechanism for moving a shutter blade, or a filter element or other such component, between spaced apart first and second end positions by magnetic force. For instance, electromagnets have been used to move a shutter blade between a first position which allows light to pass through an unshuttered aperture, to a second position which prevents the passage of light through the aperture.

Such known shutter mechanisms operate to fully cover or fully uncover the aperture, and are not adapted or even desired to provide a third position in which the aperture may only be partly covered (a half attenuation mode). Further, such prior art devices are ordinarily fairly large, and are not designed to operate at a rate of many cycles a second.

SUMMARY OF THE INVENTION

An advantage of the electromagnetic shutter devices being considered is that the barest minimum of movable parts are employed in the shutter. For example, a shutter apparatus comprised of a blade carried at one end of an elongated arm which is pivotably mounted for movement between opposed electromagnet poles has only one moving part in the form of the pivotally mounted elongated arm. Further, the shuttering operation can be simply effected by merely exciting the coils of the electromagnets to drive the arm, typically by action on a permanent magnet carried by the arm, thus moving the shutter blade between its two end positions.

It has now been found that such a simple electromagnetic shutter mechanism can be used to particular advantage in applications which call for the use of an extremely small shutter apparatus that can also be operated with great rapidity. For instance, it has been found desirable to selectively control the light going to or coming from a single optic fiber element. A practical application for a single optic fiber shutter would be in a high power light transmission application, such as an outdoor character image display. Such a display would be comprised of a matrix of pixels formed from single fiber optic elements terminating at one end in expansion or diffusion lenses in a light board display face. The other end of each optic fiber would be arranged in a similar, although much smaller, illumination matrix, with a single independently operable shutter mechanism for each fiber. The entire array of fiber ends in the illumination matrix could then be illuminated by a single light source, with the illumination of each pixel in the display face effected by the individual shutters.

Obvious advantages attendant to such a display system are apparent in the ability to simply control each of a large number of pixels, as well as the large reduction in power consumed through the use of only a single source of illumination for the light display, versus the thousands of individual electric lamps which may be used to compose the ordinary outdoor display. For such an optic fiber display system to operate effectively, however, the individual shutter mechanisms must be extremely small, and the power consumed by the multitude of shuttering mechanisms must likewise be quite small. If a "moving" display is required, very rapid shuttering speeds are necessary, particularly if the display is to generate continuously changing images on the order of a real time picture transmission quality.

It has been a primary object of the invention to provide a simple and efficient shutter mechanism for a light aperture which can effect very rapid and repeated shuttering operations. Another object of the invention has been to provide an apparatus for selectively shuttering a light aperture wherein a shutter blade carried on a movable member can be moved between and retained in spaced apart end positions.

Yet another object of the invention has been to provide a shutter mechanism in a small and compact size for example, in a size to efficiently and effectively shutter a single optic fiber.

A further object of the invention has been to provide a shutter mechanism with an extremely low energy consumption, on the order of several milliwattsecs per actuation.

Yet another object of the invention has been to provide a shutter mechanism wherein the moving components are extremely light in weight, and which utilizes a thin flexible member as the shutter blade support, rather than a pivotable shutter blade carrying member The flexible member may be laterally flexible, i.e., bendable between end positions, or in the form of a twistable torsion bar or beam supporting the shutter blade for movement at one end, for example.

A further object of this invention has been to provide a shutter mechanism wherein the shutter blade has three stable positions corresponding to full, partial and no shuttering of the aperture.

Still a further object of the invention has been to provide and improved shutter apparatus which includes an E-shaped pole piece or armature having a middle and salient pole which facilitates operation of the mechanism.

These and other objects are accomplished in this invention in an apparatus for selectively shuttering a light aperture or channel which includes a shutter blade that is rapidly moved by magnetic force between spaced apart end positions. The shutter apparatus maintains the shutter blade stable in either of the two end positions by magnetic attraction, and in its preferred form, provides a third stable position for the shutter blade which is intermediate the two end positions, such that the shutter blade has three stable positions corresponding to full, partial and no shuttering of the aperture.

The apparatus essentially comprises, in its preferred form, a member which is movable between two spaced apart end positions which are defined by stops. A shutter blade is carried by the movable member and is oriented to be interposable between a light aperture or light channel opening and a source of illumination. Permanent magnetic material (e.g., a permanent magnet) is also carried by the movable member. An electromagnetic system effects the selective movement of the movable member, and hence the shutter blade, by attracting and/or repelling the permanent magnetic material for movement between the two end stops. In one mode of operation of the electromagnetic system, the permanent magnetic material is caused to engage and come to rest against one or the other of the two end stops, whereupon the shutter blade remains in a stable position due to the attraction of the permanent magnetic material to the ferromagnetic stop. In another mode of operation, the electromagnetic system causes the permanent magnetic material to maintain a position between the two end stops, thus providing a third stable position for the shutter blade.

In accordance with one embodiment of the invention, the shutter mechanism comprises a flexible elongated member in the form of a thin spring bar or reed which is fixed at one end in a mount in a cantilever arrangement, and is otherwise free to bend laterally. A shutter blade is carried at the other end of the reed and is thus freely movable in an arc upon lateral flexion of the reed. The permanent magnetic material is an elongated permanent magnet presenting opposed poles of opposite polarity. The permanent magnet extends transverse to the reed, and is preferably mounted at a point adjacent the shutter blade.

First and second electromagnets, each including a ferromagnetic core piece, such as 1% carbon steel music wire, and an electrically conductive winding thereon, are respectively located on opposite sides of the flexible reed and spaced therefrom. A portion of the cores of each electromagnet extends into the curved path defined by the movement of the permanent magnet, and is preferably covered by an insulating (impact absorbing) bumper thereby defining a respective end stop for the permanent magnet.

The electromagnetic coils can be excited in one mode to present poles of the same polarity adjacent to the poles of the permanent magnet. This causes the permanent magnet to be attracted to one electromagnetic pole and repelled by the other, thereby bending the reed and driving the shutter blade between its two end positions. In another mode, the electromagnets are actuated to each present a pole opposite to that of the nearest pole of the permanent magnet. The permanent magnet is thereby repelled by both electromagnetic poles, causing the permanent magnet to maintain a position between the two electromagnets. The foregoing two modes of selective actuation of the electromagnets provides the shutter blade with three stable positions which correspond to full, partial and no shuttering.

In its preferred form, the electromagnetic system includes an E-shaped pole piece of hard (high retentivity, low coercivity) ferromagnetic material which presents three poles. The two outermost poles each have an electrically conductive winding on the pole or core, thereby forming first and second electromagnets which are arranged and operate as previously described. An impact absorbing bumper is located on each pole piece to prevent direct impact of the permanent magnet against the pole piece. The middle (salient) pole is equidistant between the end poles, and generally normal to the path of travel of the permanent magnet carried by the flexible reed. This middle pole is advantageously employed to direct the streaming magnetic field which would otherwise exist in the pole piece (through actuation of the electromagnets in a like polarity), and reduce the reluctance of the system. The top or free end of the middle pole is spaced from the path of travel of the permanent magnet a sufficient distance so as not to prevent the movement of the permanent magnet between the two end positions. Further, the elongated permanent magnet is sized so that the end poles of the permanent magnet are each always on an opposite side of the middle pole, and at least slightly laterally spaced therefrom. With this arrangement, the middle pole advantageously cooperates with the two electromagnetic outer poles to drive the permanent magnet between the two end positions.

Another embodiment of the shutter mechanism comprises a thin torsion bar or beam for the flexible member which carries the shutter blade. The torsion bar is fixed at one end in a mount and extends generally parallel to the elongated poles of the armature. The shutter blade, which is part of a flag, is fixed at the free end of the torsion bar. The flag extends generally perpendicularly from the torsion beam and between the two poles which form the end stops of the shutter apparatus. The permanent magnet is carried on the flag. The torsion beam and flag combination are mounted in a cantilever fashion, with the flag being readily moved by the electromagnets.

This second embodiment of the shutter mechanism also advantageously has the permanent magnetic material mounted in a recess formed in the body of the flag. The ends of the permanent magnet are spaced inwardly from the adjacent ends of the recess, so that the material of the flag (e.g., high impact plastic) serves as an impact absorbing bumper. No bumper is therefore provided on the outer poles of the electromagnetic pole piece, eliminating an assembly step.

A novel housing for the shutter mechanism is also provided in this second embodiment which greatly improves the ease of assembly of the shutter mechanism, and yields a compact shutter apparatus which can be readily employed in use by simply being plugged into a suitable p.c. board.

A particular use of the shutter apparatus of this invention is as a shutter for a single light channel, i.e., a single optic fiber. Such optic fibers are well known, being composed of a highly transparent material which is preferably flexible to facilitate its use as a light transmitting channel. Clear plastics, such as lucite and plexiglas, are ordinarily suitable for such fibers, although flexible glass can also be used. The optic fibers have a higher refractive index than the surrounding medium to function as a light channel and prevent the loss of light during transmission. Optic fibers come in various sizes; the fibers hereinafter referred to generally will have a diameter of about 0.1 inch. The shutter mechanism is accordingly quite small, preferably fitting within an area of a square on the order of 0.5 inches on a side. It will be noted that as used herein, a single optic fiber implies a single strand (monofilament) fiber element, as well as a fiber element such as a cable made up of a plurality of strands or filaments forming an optic channel.

In a present application, each of the shutters in combination with a single fiber optic element forms a pixel, with thousands of such pixels being organized into a matrix array in a display sign board. Because of the small size of these shutters and the efficiency of the shutter mechanism of this invention, an extremely small amount of power is required for operation of the shutters in such a display board, with the electromagnets of the shutters operable with currents on the order of about 250 milliamps in about 0.2 millisecond pulses, for example. Further, the small scale of the shuttering mechanisms permits the organization of the shutters and fiber ends in an illumination matrix which can be illuminated by a single light source. This further decreases the power consumption of the system, since only one light source is necessary for such a matrix, and has the salutary benefits of improving the maintainability and efficiency of such a display. This is to be compared to display systems utilizing separate incandescent bulbs as the pixels in a similar display, or separate sources of illumination for each optic fiber or bundle of fibers.

The small compact size of the shutter as well as its overall operative efficiency permit the shutter to presently be operated at speeds on the order of up to 55 operations per second, i.e., movement from one pole to another. It is thus possible to use such shutters in a fiber optic light display board in a manner to create a moving light display, with individual pixels changing faster than the human eye can follow. Such a display utilizing the shutters of this invention can provide continuously changing images on the order of a real time quality video picture.

The foregoing objectives, features and advantages of the present invention will be more readily understood upon consideration of the following detailed description of the invention taken in conjunction with the accompanying drawings in which:

DETAILED DESCRIPTION OF THE INVENTION

Figure 1:
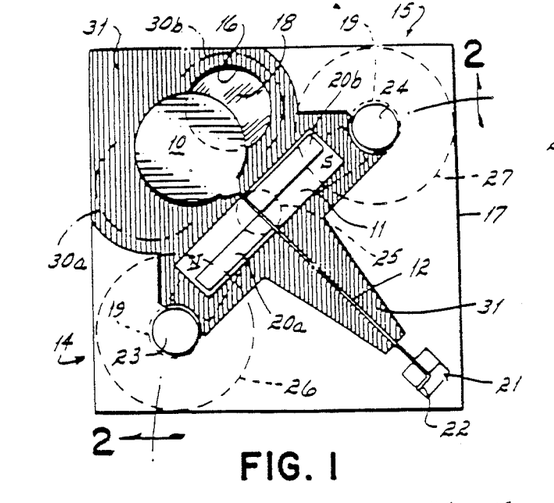
FIG. 1 is a plan view of an embodiment of the shutter mechanism of this invention.
Figure 2:
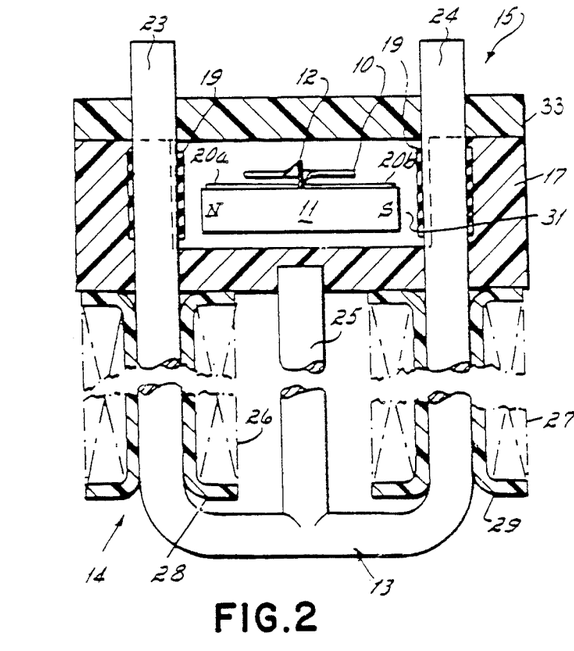
FIG. 2 is a cross-sectional view taken along line 2—2 of FIG. 1.

With reference to FIGS. 1 and 2, the principal elements of the shutter apparatus of this invention, as illustrated in a first embodiment, comprise a shutter blade 10, permanent magnetic material in the form of an elongated permanent magnet 11, a movable member in the form of a thin beam or reed 12 which carries the shutter blade 10 and permanent magnet 11, and an electromagnetic system including an E-shaped pole piece generally indicated at 13 with electromagnets 14 and 15 formed thereon. The shutter apparatus is particularly adapted for use as a shutter mechanism for a single light channel, such as the single optic fiber 18. One end of the optic fiber 18 is shown here terminating in an aperture 16 in a shutter base 17. This end of the fiber is disposed for illumination by a source of light (not shown) which would be directed to illuminate the face of the shutter mechanism as shown in FIG. 1. Although the invention will be described in this particular environment and on a scale commensurate with this particular application of the invention, it will be recognized that this invention is not accordingly limited in size or scope.

The principal object of this invention in its application as a shutter for the optic fiber element 18 is to provide a simple, effective and reliable shutter mechanism which is of very small size, which is relatively cheaply and easily manufactured, which is capable of very rapid controlled cyclic shuttering, which operates on extremely low power, and which is durable over an extended period of operation. The present shuttering mechanism is consequently designed with an eye towards minimizing (a) the number of parts required for assembly of the apparatus, and (b) the power consumed in driving the shutter.

On its most basic level, the shutter utilizes a shutter blade 10 which is interposable through a magnetic driving force between a source of illumination and the fiber optic element 18 to thereby cover, uncover, or partially cover the light channel represented by the optic fiber. Light allowed to pass into the fiber 18 is transmitted to the other terminus of the optic fiber which may be in an expansion lens in a signboard display.

The shutter blade 10 is formed integral with a metal reed 12, as by stamping. Beryllium copper is presently preferred as the metal, primarily for its stiffness and its reduced tendency to interfere with the magnetic flux pattern set up by the electromagnetic system. 304 stainless steel has also been tried as the reed material. This particular stainless steel is mildly magnetic, and it has been found that its use in this arrangement further reduces the energy required for shutter operation. The physical mechanism responsible for this result has not as yet been ascertained; however, it appears that using a reed composed of a material having a tailored magnetic response can enhance the magnetic circuit used in this shutter mechanism, and thereby further reduce the energy consumed in operating the shutter. Other materials, such as plastics, could also be advantageously used for the reed material.

Figure 3A:
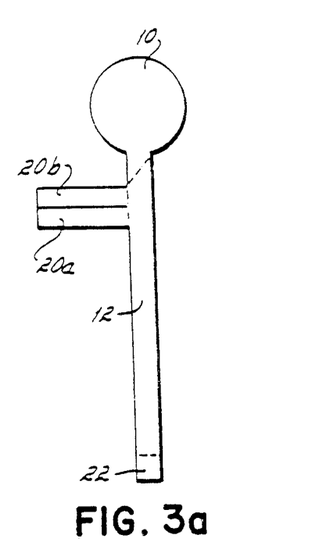
FIG. 3a is a view of the stamping for the shutter blade and flexible reed as fabricated.
Figure 3B:
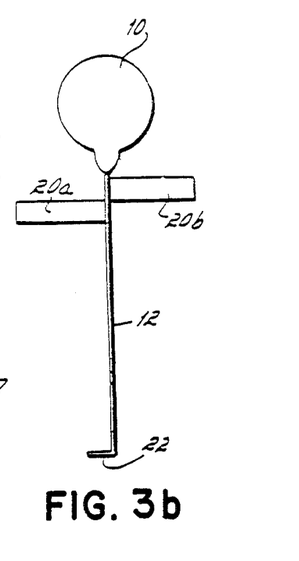
FIG. 3b is a plan view of the shutter blade and flexible reed as formed for assembly.

As more clearly shown in FIGS. 3a and 3b, the shutter blade 10 and reed 12 are stamped in a single piece from a sheet of beryllium copper having a thickness of 0.002 inches. The shutter blade is circular, having a diameter of about 0.13 inches which is sufficient to completely eclipse the face of the optic fiber 18, which here has a diameter of about 0.1 to 0.12 inches. In assembly, the shutter blade 10 is twisted with respect to the reed 12 so that the plane of the shutter blade 10 is normal to the plane of the reed 12. The length of the reed is about 0.4 inches measured from the point of the twist to the other end of the reed, and the reed has a width of about 0.04 inches, giving it good stiffness to support the shutter blade 10 and permanent magnet 11, but adequate flexibility for lateral movement between the electromagnets 14 and 15.

Also stamped integral with the shutter blade and reed are a pair of permanent magnet supporting ears or wings 20a and 20b. Each of the wings is about 0.075 inches in length and about 0.03 inches in width. For assembly, the wings 20a, 20b are separated and are respectively bent in different directions normal to the plane of the reed 12. This forms a support surface to which the permanent magnet 11 is attached. It has been found advantageous in this embodiment of the invention to locate the wings 20a and 20b and, accordingly, the permanent magnet 11, adjacent the shutter blade 10 and spaced from the fixed end of the reed.

The permanent magnet material used herein is a magnet made from sintered Alnico 8 material, 0.094 inches in length and about 0.06 inches in diameter. The relatively small size of the permanent magnet tends to limit the selection of the various magnetic materials available. It has been found that the most cost effective permanent magnets in this size range are sintered magnet materials which are press formed into shape, preferably without machine finishing, e.g., grinding. Alnico 5 and particularly Alnico 8 materials exhibit excellent B·H energy products in such a sintered and pressed form.

It will be recognized that although a cunife wire magnet, a ceramic magnet or a rare earth magnet such as one of samarium cobalt could also be used herein, for purposes of economy, the indicated Alnico magnet is presently preferred.

The magnet 11 presents end poles of opposite polarity in this embodiment of the invention, which for purposes of further description will be respectively described as either north or south poles as indicated in the figures. The permanent magnet is fixed to the permanent magnet supporting wings 20a, 20b in a conventional manner, as by gluing.

The entire assembly of shutter blade 10, permanent magnet 11 and flexible reed 12 is mounted for relatively free lateral movement by fixing the end of the reed 12 in a mount 21 in a conventional manner. This cantilever arrangement permits the reed 12 to bend laterally thereby providing arcuate movement to both the shutter blade 10 and the permanent magnet 11. Mounting of the reed is facilitated in this embodiment through the provision of a mounting flange 22 which is bent from the end of the reed, and which fits into a slot formed in the mount 21, being wedged in place.

Movement of the shutter blade 10 between two end positions characterized by complete covering and complete uncovering of the end of fiber optic element 18 is effected by magnetic force applied to the permanent magnet 11 by the electromagnetic system employed. That is, selective actuation of the electromagnets 14, 15 causes the permanent magnet 11 to be attracted as well as repelled to abut against one of the bumpers 19 on cores 23 or 24 of one of the electromagnets 14 and 15, respectively. The permanent magnet thereupon remains in this position even when the electromagnets are deactuated, due to the attraction of the permanent magnet to the ferromagnetic core, which may be residually magnetized.

While soft iron (low retentivity material) has been used successfully as a core, it has been found that common carbon (1%) steel, e.g., music wire, which is annealed at 1000° F. allows faster shutter cycling. The "hard" magnetic core (high retentivity, low coercivity) of carbon steel exhibits hysteresis or residual magnetism, which permits the core to be magnetized by a very short pulse of current through the electromagnet coil. The core once magnetized in a given sense (N or S), no longer requires current flow through the coil to attract/repel the permanent magnet. The permanent magnet on the shutter reed 12 thus continues to be attracted toward a respective attracting electromagnetic pole even after the actuating current pulse has stopped, permitting greater cycling speed for the shutter.

The preferred electromagnetic system used herein comprises an E-shaped pole piece 13 of 1% carbon steel which presents two outer poles 23 and 24 which form the cores for the electromagnets 14 and 15, respectively, and a middle salient pole 25. Each of the outer poles has an exciting coil 26, 27 thereon which consists of an electrically conductive winding on bobbins 28, 29. A winding of 2,000 turns of #32 copper wire has been used to advantage herein. Each of the pole pieces is of a sufficient height so that a portion of the core 23, 24 extends into the path of travel of the permanent magnet 11. Bumpers 19 surround these portions of the cores, and form the respective end stops for the permanent magnet 11, and therefore define the end positions 30a, 30b (shown in broken line in FIG. 1) for the shutter blade 10. The use of end stop bumpers. 19, which may be made of a suitable impact absorbing plastic or rubber material, with hard magnetic core materials with low coercivity (such as the 1% carbon steel), prevents the moving permanent magnet from demagnetizing or remagnetizing the core.

In this embodiment, the outermost poles are about 0.5 inches apart, measured center to center on the cores, and the middle pole 25 is equidistant between the two poles. The diameter of all of the 0 pole pieces is approximately 0.050 inches. It will be noted that the middle pole 25 is slightly offset from a center line running between the two outermost poles so that the middle pole 25 is substantially normal to the center of the arcuate path of travel of the permanent magnet 11. The center pole 25 is also shorter than the outer poles, a condition which will be hereinafter discussed in more detail. It may, nevertheless, be noted at this point that the gap between the top of the center pole 25 and the bottom of the permanent magnet 11 is equal to approximately one-quarter of the distance between the two outer poles, which in this embodiment is a gap distance of about 0.1 inch.

The ends of the poles of the pole piece 13 extend through apertures provided in the base 17 in a snap type fit. The base is advantageously formed of plastic and is injection molded. A contoured recessed area 31 is formed in the base in which the reed 12, permanent magnet 11 and shutter blade 10 are received. The pole pieces 23 and 24 may be further elongated to provide the means for attaching the shutter mechanism in a matrix formed on a printed circuit board 33.

The exciting coils 26, 27 of the electromagnets can be connected to each other in series alone if a bi-stable shutter is only required, or preferably in a manner to provide for independent operation of each electromagnet. This latter arrangement will be the one particularly described herein.

The coils 26, 27 are connected to a common source of current by means of a control system which determines whether the coils are to be excited so as to induce like poles in the ends of the core pieces adjacent the permanent magnet (N, N, or S, S) or opposite poles (N, S or S, N). The control system also determines the length of time during which the coils are excited.

In operation as a tri-stable shuttering apparatus, that is, an apparatus in which the shutter blade 10 is to occupy end positions corresponding to complete shuttering of the fiber optic element 18 or complete uncovering of the fiber optic element 18, and a third stable position partially covering the fiber optic element so as to give a half-tone image, the coils 26, 27 of the electromagnets 14, 15 would be excited as follows. Without any electromagnetic force acting on the permanent magnet, the normal rest position for the shutter blade 10 would be between its two end positions 30a, 30b. This is due to the natural resistance of the reed 12 to flexion. In this position, the shutter blade 10 overlies a portion (approximately half) of the optic fiber end 18, which produces a half-tone or half attenuation of the light being-transmitted by the optic fiber to a terminus in a lens in a light display board.

Given the orientation of the poles of the permanent magnet 11 as previously indicated, in order to drive the shutter blade 10 to a position (30b) fully covering the fiber optic element end 18, both of the coils would be excited so as to induce north poles at the ends of the pole pieces 23 and 24. The north pole of the permanent magnet 11 would accordingly be repelled by the north pole of electromagnet 14, while the south pole of the permanent magnet 11 would be attracted to the north pole of electromagnet 15. The stray field of the permanent magnet 11 is sufficiently strong so that the magnet remains in this position due to attraction between the permanent magnet and the core 24 of the electromagnet, which in this embodiment will further have a residual attractive polarity. The optic fiber end 18 is thereby completely covered by the shutter blade 10.

If it is desired to fully expose the fiber optic element 18 to illumination (position 30b of shutter 10), the process is reversed so that the coils 26, 27 of the electromagnets are excited to produce south poles adjacent the ends of the electromagnets 14, 15, thereby repelling the permanent magnet from core 24 while attracting the north pole of the permanent magnet to core 23 of electromagnet 14. Again, the magnetic attraction between the permanent magnet 11 and the core 23 of the electromagnet maintains the shutter blade 10 in this fully uncovered condition.

Magnetic insulation (not shown) may also be provided surrounding the shutter mechanism to prevent spurious external magnetic interference with the operation of the shutter.

The permanent magnet 11, and therefore the shutter blade 10, is caused to maintain a third stable position between the two end positions by exciting the coils of the electromagnets so that the permanent magnet is repelled away from each end position. Again referring to the arrangement herein, the coil 26 of electromagnet 14 is excited so as to induce a north pole adjacent the north pole of the permanent magnet 11, and the coil 27 of electromagnet 15 is pulsed to produce a south pole adjacent the south pole of the permanent magnet. The permanent magnet 11 would therefore occupy a position between these repelling magnetic forces which would be maintained even when the coils are deactuated due to the natural resistance to flexion of the reed 12. Of course, when hard magnetic core material is used, the centering forces are present even when the current does not flow, because of the residual magnetism induced in the two pole pieces and the salient middle pole.

The middle and salient pole 25 of the E-shaped pole piece is provided to take advantage of the streaming magnetic field which would ordinarily exist in its absence, where like poles of like polarity are induced at the ends of the two outermost poles. The salient pole 25 reduces the overall reluctance of the magnetic system, and in this arrangement, it is also advantageously employed to enhance the magnetic force being applied to move permanent magnet 11.

The permanent magnet 11 and the E-shaped pole piece 13 are cooperatively sized so that the polar ends of the permanent magnet 11 always remain on opposite sides of the middle pole 25, and are slightly spaced therefrom. That is, with the north pole of the permanent magnet 11 abutting against the bumper 19 of core 23 of electromagnet 14, the south pole of the permanent magnet 11 is on the opposite side of the center pole 25, with the end slightly spaced from that side. Likewise, the north pole of the permanent magnet will be spaced from the center pole 25 with the south pole of the permanent magnet abutting against the core 24 of the electromagnet 15. Taking the example where it is desired to move the permanent magnet from a rest position against the bumper 19 of core 23 (full uncovered, 30a) to a rest position against the bumper of core 24 (fully covered, 30b), north poles would be induced in the ends of the pole pieces 23 and 24. A south pole would accordingly be induced in the salient pole 25. This south pole would repel the nearby south pole of the permanent magnet, thereby driving it towards core 24, while also attracting the north pole of the permanent magnet, further contributing to the movement of the permanent magnet. It will of course be recognized that the same operation would work in reverse in moving the permanent magnet from rest against bumper 19 of core 24 to abut against bumper 19 of core 23.

It has been found in the practice of this invention that the center pole 25 must be spaced a sufficient distance from the permanent magnet to avoid counteracting the effects of the two electromagnets. This distance will of course vary with the relative strengths of the electromagnets, the permanent magnet, and the shape of the permanent magnet. In this embodiment, the gap distance is about 0.1 inch. It may also be noted that, in general, the ratio between the length of the permanent magnet to its diameter (or width) should be in the range of from 1:1 to 4:1 to maximize the effectiveness of the magnet.

Another embodiment of the shutter apparatus of this invention is illustrated in FIGS. 4–7. Like the previous embodiment, the shutter apparatus generally comprises a shutter blade, here in the form of a flag 50, an elongated permanent magnet 51, an electromagnetic system including an E-shaped pole piece or armature generally indicated at 52 having electromagnets 53 and 54 formed thereon, and a movable member, here in the form of a thin torsion bar or beam 55 which carries the flag 50 at one end. This shutter apparatus is also particularly adapted for use as a shutter mechanism for an optic channel represented by the aperture 58 in FIG. 4.

The torsion beam 55 is formed from a phosphorous bronze sheet material of spring temper about 0.002 in. thickness; it could also be made of the same beryllium copper as the shutter blade and reed 10, 12 of the previous embodiment. The torsion beam 55 is approximately 0.963 in. long and is formed into an L having perpendicular sides approximately 0.02 in. in width. One end of the torsion beam 55 is fixed in a mount 62 (FIGS. 5 and 6) which is part of a shutter case made up of a base 63a, a cover 63b and a socket portion 63c. The flag 50 is fixed to the free end of the torsion beam 55, with both the flag 50 and torsion beam 55 suspended in cantilever fashion.

The flag 50 (FIG. 7) is a single piece molded plastic element having an aperture covering blade 64, a body portion 65 and a base 66. A recess 67 is formed in the body 65 of the flag, and receives the permanent magnet material 51 therein. The flag itself is approximately 0.638 in. in length from end to end, with the blade 64 having a diameter of about 0.16 in. The permanent magnet 51 is located about 0.3 in. from the axis of the torsion beam 55. It is a sintered Alnico material about 0.1 in. long and about 0.068 in. in diameter.

Figure 4:
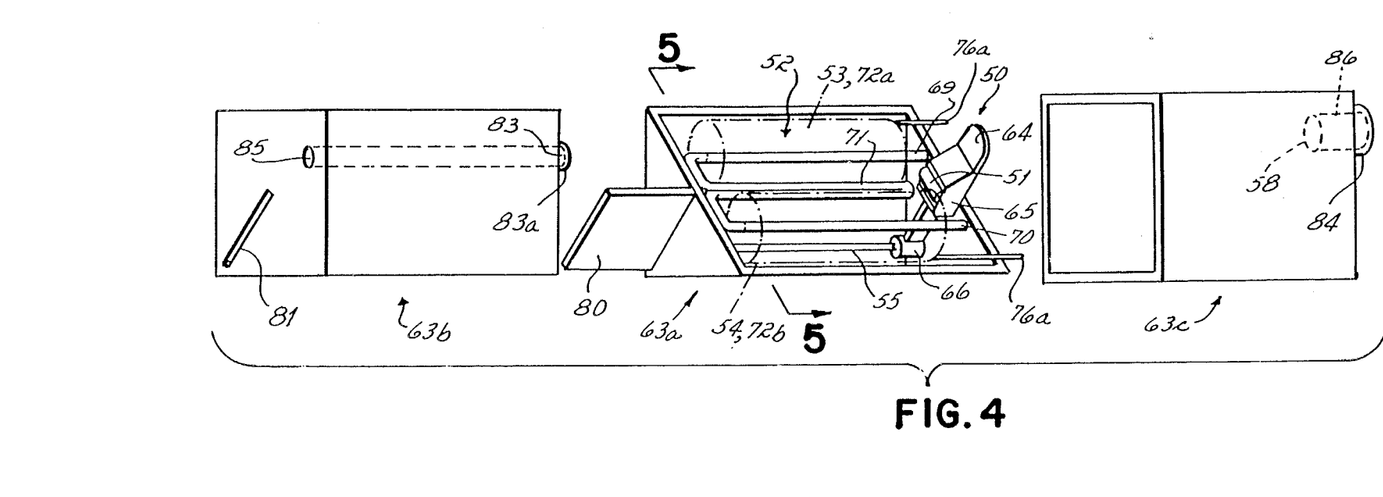
FIG. 4 is a perspective view of another embodiment of the shutter mechanism of this invention, partially disassembled for detail.
Figure 7:
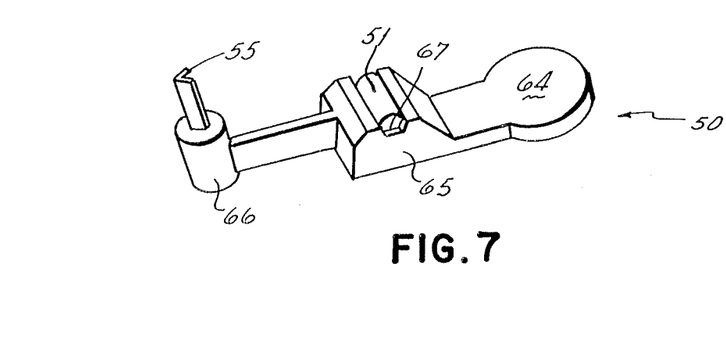
FIG. 7 is a detailed view of the flag of this second embodiment.

The torsion beam 55 is received in a socket formed in the base 66 of the flag 50, and is fixed therein. The flag 50 extends generally perpendicular from the torsion beam 55, and is located between outer poles 69 and 70 of the armature 52, such that the permanent magnet 51 is about equidistant between the two poles 69, 70 in its rest position. To this end, torsion beam 55 is mounted to extend generally parallel to the armature 52 along a midline between the two poles 69, 70. The E-shaped armature 52 is completed by a middle or salient pole 71. Outer poles 69, 70 form the end stops for the flag 50.

The electromagnetic system employed in this embodiment is generally the same as that previously described. The armature 52 is preferably formed of a single piece of music spring quality steel wire which is bent into the E-shaped pole piece. The preferred steel wire for the armature conforms to ASTM A228, with a diameter of about 0.048 in. A distance of about 0.3 in. as measured between the middles of the outer poles 69, 70 is provided in this embodiment.

The electromagnets 53, 54 have exiting coils or windings 72a, 72b, respectively, each of 1200 turns of No. 36 magnet wire. The windings 72a, 72b are wound on plastic bobbins 74, 75. Mounted at one end of each of the bobbins are a pair of stiff wire connectors 76a, 76b, which form the electric terminals for the coils. The connectors 76a, 76b are received in conductive terminals 77a, 77b provided in the socket portion 63c of the casing, and have conductive pins 78a, 78b extending outwardly therefrom. The entire electromagnetic system is thus easily fabricated, and readily assembled with the rest of the apparatus by simply sliding the connectors 76a, 76b into the coil terminals 77a, 77b. Each of the shutter apparatuses is in turn readily mounted, such as in a pc board, by simply inserting the pins 78a, 78b into appropriate sockets therein.

Although not shown herein, steering diodes can be provided in the circuitry of the electromagnets to prevent cross-path currents from one shutter mechanism from acting on an adjacent shutter apparatus, such as might occur in row scanning circuitry used in a multiplexing mode.

It will be noted that the permanent magnet 51 is sized slightly smaller than the recess 67 of the flag in which it is received. The ends of the permanent magnet 51 are thus spaced slightly inwardly from the lateral sides of the flag 50 which define the recess ends. The plastic material of flag 50 thus serves to absorb the impact when the flag 50 strikes one of the outer poles 69, 70. This takes the place of the bumpers 19 provided on the outermost poles of the previously described embodiment.

Since the operation of the second embodiment of the shutter apparatus is identical to that previously described, it will therefore not be repeated.

Figure 5:
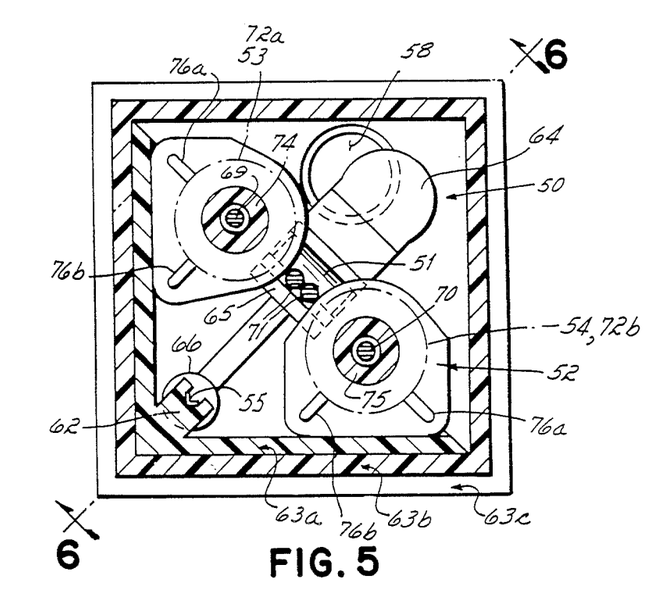
FIG. 5 is a cross-sectional view taken along line 5—5 of FIG. 4 (assembled)
Figure 6:
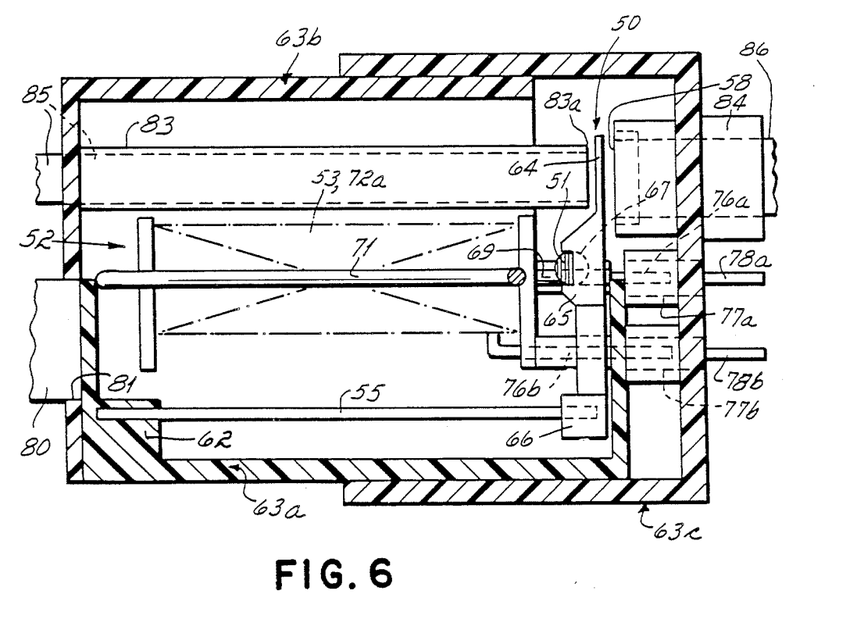
FIG. 6 is a cross-sectional view taken along line 6—6 of FIG. 5.

Another feature of the second embodiment of the shutter apparatus is the compact casing in which the shutter mechanism is mounted and contained. As previously indicated, the casing is formed of a base part 63a, a cover part 63b and a socket portion 63c. The three parts 63a, 63b and 63c are all plastic molded to snap fit together for ease of assembly of the shutter apparatus, with the socket portion 63c sliding over the outside of parts 63a and 63b to form a compact and sturdy unit for the shutter apparatus. A flange 80 on socket portion 63a extends through a slot 81 provided in cover part 63b.

The flange 80 serves as a finger grip for manipulating the shutter mechanism.

The shutter casing also advantageously includes two ferrules 83, 84 which receive respective ends of two optic fibers 85, 86 making up the light channel. Input ferrule 83 receives an end of an optic fiber 85 carrying light from a source of illumination (not shown). The fiber 85 terminates adjacent end 83a of the input ferrule. A second optic fiber 86 in output ferrule 84 then carries light from the input fiber 85 to a terminus in an optic display, e.g., a diffusion lens or the like. Aperture 58 is essentially the end of optic fiber 86. A small gap thus exists between the aperture 58 and the input ferrule end 83a within which blade 64 of the flag 50 moves to effect shuttering of the light channel. Use of the ferrules 83, 84, which can be molded with the shutter casing parts, permits the optic fibers 85, 86 to be readily attached to the shutter apparatus in proper alignment. Harnesses (not shown) applied to the ends of the optic fibers 83, 84 further facilitate assembly.

Because of the extremely small size of the shutter mechanism, the small distance of travel of the permanent magnet to the electromagnetic poles, and overall efficiency of the mechanism, very little energy is required to operate the shutter. Currents on the order of about 250 milliamps have been effectively used in these embodiments. With the resistance of the electromagnetic circuit of the first embodiment about 65 ohm d.c. per coil (inductance about 22 millihenries), pulsing the current at about 0.2 milliseconds a pulse yields an energy consumption of about $1.22 \times 10^{-3}$ watt-sec , which is an extremely small energy requirement for effective operation of the shutter. Even shorter drive pulses can be obtained by winding lower resistance (e.g., fewer turns of heavier wire) coils having lower resistance and inductance. A great number of such shutters can consequently be operated off of a lower power source.

As noted herein, the particular application of this shutter mechanism is as a shutter for a single fiber optic element forming a pixel in a light display matrix having a multitude of such fiber optic elements. The size and performance of the shutter mechanism enables extremely rapid operation of the shutters, with shuttering sequences of about 80 operations per second being presently achieved. It is thus contemplated that an extremely large array of such pixels can be organized and controlled in a large light display, such as an outdoor sign board, which can be operated in a manner so as to produce images changing in a real time picture display. The shutter mechanism is also quite durable, having a lifetime calculated to be in excess of $10^8$ operations, and verified to $10^8$ in prototypes.

The relatively simple fabrication of the various components of the shutter mechanism in relatively low cost materials along with the easy assembly of the various components further enhances the utility of this shutter.

Thus, while the invention has been described in connection with a certain presently preferred embodiment, it will be immediately obvious to those skilled in the art that many modifications of structure, arrangement, portions, elements, materials and components can be used in the practice of the invention without departing from the principles of this invention. For instance, the foregoing description of the invention employs a permanent magnet carried by the reed/flag to effect movement of the reed/flag and therefore the shutter blade. It is nevertheless within the scope of this invention to simply attract a ferrous reed/flag, or a reed/flag carrying some magnetic (e.g., ferrous) material, for movement of the shutter blade between the end positions. When unattached to one or the other of the electromagnetic poles, the reed/flag would occupy a third stable position between the end positions. More power would of course be required to magnetically hold the reed/flag in either of the end positions in this arrangement, but this may be offset by other advantages in applying the invention in this manner.

What is claimed is:

1. A shutter apparatus, comprising:
   a shutter blade movable between two spaced apart end positions,
   a movable member carrying the shutter blade between the end positions for selectively covering a light aperture,
   permanent magnetic material carried by the movable member, and
   an electromagnetic system having means for attracting and repelling the permanent magnetic material for movement of the shutter blade between the two end positions, the electromagnetic system being comprised of an E-shaped ferromagnetic pole piece, the outer poles of the pole piece forming cores having an electrically conductive winding thereon and thereby forming the first and second electromagnets which are spaced from and respectively on opposite sides of the permanent magnetic material, a portion of the core of each electromagnet so formed extending into the path of the permanent magnetic material and defining a respective end stop, the middle pole being equidistant from the two end poles and having its free end spaced from the plane of the path of movement of the permanent magnetic material, the selective operation of the electomagnetic system causing the permanent magnetic material to move and engage and come to rest in a stable position against one or the other of two spaced apart stops which determine the two end positions of the shutter blade, or causing the permanent magnetic material to maintain a third stable position between the two end stops, whereby the shutter blade has three stable positions corresponding to full, partial and no shuttering of the aperture.

2. The shutter apparatus of claim 1 wherein the core pieces retain residual magnetism, and a portion of the core of each electromagnet extends into the path of the magnetically responsive material, and further including bumper means for preventing direct impact of the magnetically responsive material against a core.

3. The shutter apparatus of claim 2 wherein the shutter apparatus can be actuated at a rate of about 80 operations per second.

4. The shutter apparatus of claim 2 wherein the distance between the end stops is about 0.5 inches or less.

5. The shutter apparatus of claim 2 wherein the electromagnetic system has an energy consumption of less than about $1 \times 10^{-2}$ watt-secs.

6. The shutter apparatus of claim 1 wherein the permanent magnetic material is an elongated permanent magnet extending transverse to the movable member, the permanent magnet presenting end poles of opposite polarity which are spaced from the movable member and on opposite sides thereof, polar ends of the permanent magnet further being sufficiently laterally spaced from the middle pole such that the polar ends are always on opposite sides of the middle pole.

7. Apparatus for shuttering an aperture, comprising:
   a shutter blade movable between two spaced apart end positions for selectively covering the aperture,
   a movable member carrying the shutter blade between the two spaced apart end positions,
   magnetic material carried by the movable member,
   an electromagnetic system having means for attracting and repelling the magnetic material for movement of the shutter blade between the two end positions, the system including an E-shaped pole piece of ferromagnetic material presenting three poles, the outermost poles forming core pieces each having an electrically conductive winding thereon, the cores and windings forming first and second electromagnets, a portion of each such core extending into the path of the magnetic material, the portions each defining a respective end stop, the middle pole being equidistant between the two end poles and generally normal to the path of travel of the magnetic material, the free end of the middle pole being spaced from the path of travel of the magnetic material, the middle pole forming a salient pole,
   selective operation of the electromagnetic system causing the magnetic material to engage and come to rest in a stable position against one or the other of the two end stops, or causing the magnetic material to maintain a third stable position between the two end stops in front of the salient pole.

8. The shutter apparatus of claim 7 wherein the nearest distance between the free end of the middle pole and the magnetic material is about one quarter of the distance between the two end poles, the distance between the two end poles being measured center-to-center on the end pole cores.

9. The shutter apparatus of claim 7 wherein the magnetic material is an elongated permanent magnet extending transverse to the movable member, the permanent magnet presenting end poles of opposite polarity which are spaced from the movable member and on opposite sides thereof, the middle pole having a longitudinal axis, the polar ends of the permanent magnet further being always on opposite sides of the longitudinal axis of the middle pole.

10. The shutter apparatus of claim 7 wherein the shutter can be cycled at a rate exceeding 10 operations per second.

11. The shutter of claim 7 wherein the electromagnetic core pieces exhibit residual magnetism.

12. The shutter apparatus of claim 7 wherein the movable member is an elongated bendable member fixed at one end in a mount and free to bend toward the end stops, the shutter blade being carried at the other end of the bendable member.

* * * * *